United States Patent [19]

Schmitter et al.

[11] Patent Number: 5,288,778
[45] Date of Patent: Feb. 22, 1994

[54] STABILIZED POLYMERS HAVING HETERO ATOMS IN THE MAIN CHAIN

[75] Inventors: André Schmitter, Hegenheim, France; Kurt Burdeska, Basel, Switzerland; Mario Slongo, Tafers, Switzerland; Jean-Luc Birbaum, Fribourg, Switzerland

[73] Assignee: Ciba-Geigy Corporation, Ardsley, N.Y.

[21] Appl. No.: 835,660

[22] Filed: Feb. 13, 1992

[30] Foreign Application Priority Data

Feb. 21, 1991 [CH] Switzerland ............... 528/91

[51] Int. Cl.⁵ .................................. C08K 5/3492
[52] U.S. Cl. .................................... 524/100
[58] Field of Search ............................ 524/100

[56] References Cited

U.S. PATENT DOCUMENTS

| | | | |
|---|---|---|---|
| 3,118,887 | 1/1964 | Hardy et al. | 544/216 |
| 3,242,175 | 3/1966 | Duennenberger et al. | 544/216 |
| 3,244,708 | 4/1966 | Duennenberger et al. | 544/216 |
| 3,268,474 | 8/1966 | Hardy | 524/100 |
| 3,270,016 | 8/1966 | Duennenberger et al. | 524/100 |
| 3,284,394 | 11/1966 | Suen et al. | 524/100 |
| 3,843,371 | 10/1974 | Piller et al. | 430/512 |
| 4,619,956 | 10/1986 | Susi | 524/87 |
| 4,831,068 | 5/1989 | Reinert et al. | 524/100 |
| 4,960,863 | 10/1990 | Rosenquist | 523/480 |
| 4,962,142 | 10/1990 | Migdal et al. | 524/100 |
| 5,084,570 | 1/1992 | Burdeska et al. | 544/216 |

FOREIGN PATENT DOCUMENTS

| | | |
|---|---|---|
| 0280653 | 8/1988 | European Pat. Off. |
| 0434608 | 6/1991 | European Pat. Off. |
| 3922496 | 1/1991 | Fed. Rep. of Germany |
| 480091 | 12/1969 | Switzerland |
| 484695 | 3/1970 | Switzerland |

OTHER PUBLICATIONS

Chem. Absts. 114, 248023w (1991).
Chem. Abst. 72, 79103d(1970).
H. Brunetti et al., Helu. Chim. Acta, 55, 1566(1972).
Chem. Abst. 77, 101540w (1972).
Chem. Abst. vol. 72, 1970 121590n.

*Primary Examiner*—Kriellion S. Morgan
*Attorney, Agent, or Firm*—Luther A. R. Hall

[57] ABSTRACT

Hydroxyphenyltriazines of formula I

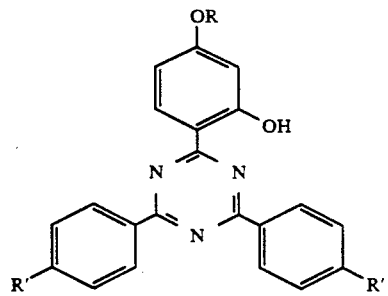

wherein R is hydrogen, $C_1$-$C_{18}$alkyl, $C_2$-$C_6$alkyl substituted by halogen or by $C_1$-$C_{12}$alkoxy, or is benzyl and R' is hydrogen or methyl, are especially suitable as stabilisers for thermoplastic polymers that comprise hetero atoms in the main chain.

11 Claims, No Drawings

STABILIZED POLYMERS HAVING HETERO ATOMS IN THE MAIN CHAIN

The invention relates to stabilised polymers having hetero atoms in the main chain, comprising as stabiliser a 2-hydroxyphenyl-s-triazine having specific substituents.

It is known to stabilise polymers against damage by light, oxygen and heat by the addition of a 2-hydroxyphenyl-s-triazine of the formula

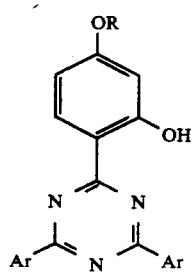

wherein R may be hydrogen or an organic radical and Ar are aromatic radicals that carry no hydroxy groups, see U.S. Pat. No. 3,244,708 and CH-B-480 091. Those compounds are UV absorbers and have also been proposed for stabilising photographic materials (U.S. Pat. No. 3,843,371) or paints (U.S. Pat. No. 4,619,956).

In those cases there were used specifically triazine derivatives wherein Ar is a 2,4-dimethylphenyl radical, because those compounds are relatively readily obtainable. Recently, methods of synthesis have been developed which make such triazines having other aryl radicals readily obtainable also (EP-A-395 938).

Surprisingly, it has now been found that, in thermoplastic polymers that comprise hetero atoms in the main chain, such triazines wherein Ar is a phenyl or a p-tolyl radical exhibit an especially good stabilising action, which is clearly superior to that of triazines wherein Ar is a 2,4-dimethylphenyl radical.

The invention therefore relates to a polymer composition that is stabilised against damage by light, oxygen and heat, comprising a) at least one thermoplastic polymer that comprises hetero atoms in the main chain, and b) as stabiliser, at least one hydroxyphenyltriazine compound of formula I

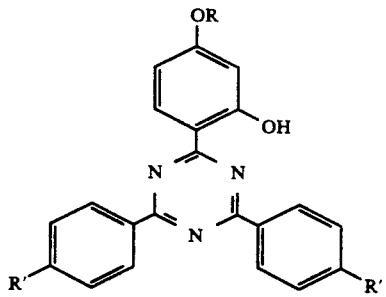

wherein R is hydrogen, $C_1$–$C_{18}$alkyl, $C_2$–$C_6$alkyl substituted by halogen or by $C_1$–$C_{12}$alkoxy, or is benzyl and R' is hydrogen or methyl.

Polymers that comprise hetero atoms in the main chain are especially polymers comprising O, S and N. Examples of such polymers are the following classes of thermoplastic polymers:

1. Polyacetals, such as polyoxymethylene, and polyoxymethylenes that comprise comonomers, for example ethylene oxide; polyacetals that have been modified by thermoplastic polyurethanes, acrylates or MBS.

2. Polyphenylene oxides and sulfides and mixtures thereof with styrene polymers or polyamides.

3. Polyamides and copolyamides, for example those derived from diamines and dicarboxylic acids and/or from aminocarboxylic acids or the corresponding lactams, such as polyamide 4, polyamide 6, polyamide 6/6, 6/10, 6/9, 6/12, 4/6, polyamide 11, polyamide 12, aromatic polyamides starting from m-xylene, diamine and adipic acid; polyamides prepared from hexamethylenediamine and iso- and/or tere-phthalic acid and, where appropriate, an elastomer as modifier, for example poly-2,4,4-trimethylhexamethylene terephthalamide, poly-m-phenylene isophthalamide. Block copolymers of the above-mentioned polyamides with polyolefins, olefin copolymers, ionomers or chemically bonded or grafted elastomers; or with polyethers, for example polyethylene glycol, polypropylene glycol or polytetramethylene glycol. Also polyamides or copolyamides modified by EPDM or ABS; and polyamides condensed during processing ("RIM polyamide systems").

4. Polyureas, polyimides, polyamide-imides and polybenzimidazoles.

5. Polyesters, for example those derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and block polyether esters derived from polyethers having hydroxy end groups; also polyesters modified by polycarbonates or by MBS.

6. Polycarbonates and polyester carbonates, especially aromatic polycarbonates, for example those based on 2,2-bis(4-hydroxyphenyl)propane or 1,1-bis(4-hydroxyphenyl)cyclohexane.

7. Polysulfones, polyether sulfones and polyether ketones, especially aromatic polymers of that class.

8. Mixtures (polyblends) of such polymers with one another or with other polymers, for example with polyolefins, polyacrylates, polydienes or other elastomers in the form of impact strength modifiers.

Among those compounds, preference is given to the polycarbonates, polyesters, polyamides, polyacetals, polyphenylene oxides and polyphenylene sulfides, but especially to the polycarbonates. Those compounds are to be understood as being especially those polymers the constitutional repeating unit of which corresponds to the formula

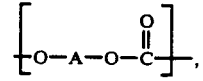

wherein A is a divalent phenolic radical. Examples of A are given inter alia in U.S. Pat. No. 4,960,863 and DE-A-3 922 496. A can be derived, for example, from hydroquinone, resorcinol, dihydroxybiphenylene or bisphenols in the broadest sense of the term, such as bis(hydroxyphenyl)alkanes, cycloalkanes, sulfides, ethers, ketones, sulfones, sulfoxides, α,α'-bis(hydroxyphenyl)-diisopropylbenzenes, for example the compounds 2,2-bis(4-hydroxyphenyl)propane, 2,2-bis(3,5-dimethyl-4- hydroxyphenyl)-propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane, or from the compounds of the formulae

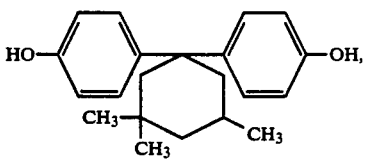

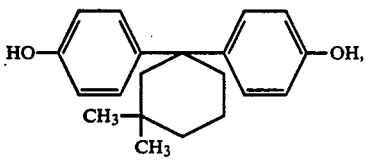

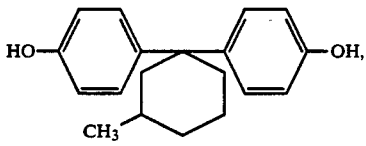

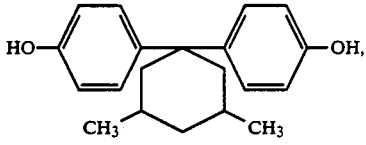

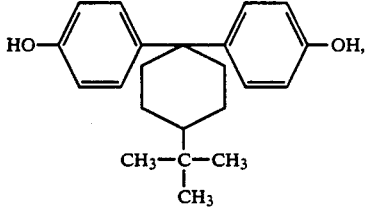

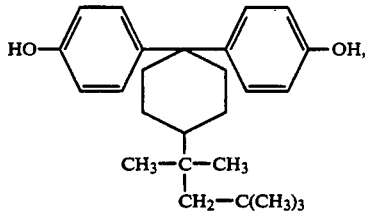

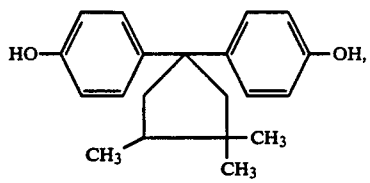

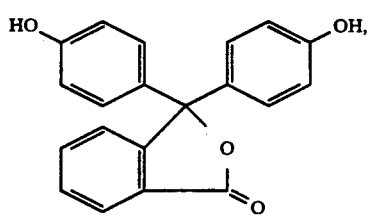

-continued

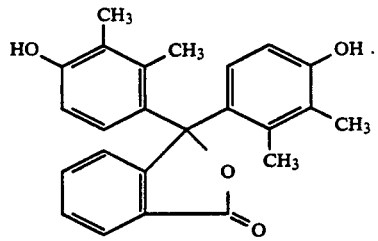

The polymers of component a) may be linear or branched. The shaping of those polymers takes place at a relatively high temperature, for example polycarbonate is injection-moulded at from 220° to 330° C. At those temperatures most of the customary light-stabilisers and antioxidants are unstable and begin to decompose. The above-mentioned triazine derivatives according to the invention are, however, extremely resistant to high temperatures and are therefore especially suitable for stabilising the mentioned polymers.

When R in formula I is $C_1-C_{18}$alkyl, it may be linear or branched alkyl and may be, for example, methyl, ethyl, propyl, isopropyl, butyl, isobutyl, pentyl, hexyl, 2-ethylbutyl, heptyl, octyl, 2-ethylhexyl, nonyl, decyl, dodecyl, tetradecyl or octadecyl. R is halo-substituted or $C_1-C_{12}$alkoxy-substituted $C_2-C_6$alkyl may be, for example, 2-chloroethyl, 2-fluoroethyl, 2-methoxyethyl, 2-ethoxyethyl, 2-isopropoxyethyl, 2-methoxypropyl, 3-butoxypropyl, 2-butoxyethyl, 2-hexyloxyethyl, 2-octyloxyethyl or 2-dodecyloxyethyl.

R is preferably $C_1-C_{12}$alkyl or benzyl, especially $C_3-C_6$alkyl, very especially propyl.

In formula I R' is preferably hydrogen.

Examples of compounds of formula I are:
2,4-diphenyl-6-(2-hydroxy-4-methoxyphenyl)-1,3,5-triazine
2,4-diphenyl-6-(2-hydroxy-4-ethoxyphenyl)-1,3,5-triazine
2,4-diphenyl-6-(2-hydroxy-4-propoxyphenyl)-1,3,5-triazine
2,4-diphenyl-6-(2-hydroxy-4-butoxyphenyl)-1,3,5-triazine
2,4-diphenyl-6-(2-hydroxy-4-hexyloxyphenyl)-1,3,5-triazine
2,4-diphenyl-6-(2-hydroxy-4-octyloxyphenyl)-1,3,5-triazine
2,4-diphenyl-6-(2-hydroxy-4-dodecyloxyphenyl)-1,3,5-triazine
2,4-diphenyl-6-(2-hydroxy-4-benzyloxyphenyl)-1,3,5-triazine
2,4-diphenyl-6-(2-hydroxy-4-(2-butoxyethoxy)phenyl)-1,3,5-triazine
2,4-di-p-tolyl-6-(2-hydroxy-4-methoxyphenyl)-1,3,5-triazine
2,4-di-p-tolyl-6-(2-hydroxy-4-propoxyphenyl)-1,3,5-triazine
2,4-di-p-tolyl-6-(2-hydroxy-4-butoxyphenyl)-1,3,5-triazine
2,4-di-p-tolyl-6-(2-hydroxy-4-hexyloxyphenyl)-1,3,5-triazine
2,4-di-p-tolyl-6-(2-hydroxy-4-pentoxyphenyl)-1,3,5-triazine
2,4-di-p-tolyl-6-(2-hydroxy-4-octyloxyphenyl)-1,3,5-triazine 2,4-di-p-tolyl-6-(2-hydroxy-4-benzyloxyphenyl)-1,3,5-triazine 2,4-di-p-tolyl-6-(2-hydroxy-4-(2-hexyloxyethoxy)-phenyl)-1,3,5-triazine.

The compounds of formula I are known compounds or can be prepared analogously to known compounds. They can be prepared in principle by etherifying the corresponding 2,4-diaryl-6-(2,4-dihydroxyphenyl)-1,3,5-triazines. The etherification takes place selectively in the 4-position, because the OH group in the 2-position is sterically hindered by a hydrogen bridge bond. The preparation and etherification of the 2,4-dihydroxyphenyltriazines are described, for example, in Helv. Chim. Acta 55 (1972), 1566–95; EP-A-395 938; U.S. Pat. No. 3,118,887; U.S. Pat. No. 3,242,175 or U.S. Pat. No. 3,244,708.

The amount of stabiliser to be used depends on the polymer to be stabilised and on the intended use of the stabilised polymer. In general, the polymer composition according to the invention comprises from 0.1 to 15, especially from 0.1 to 5, parts by weight of stabiliser (component b) to 100 parts by weight of polymer (component a).

The stabiliser (component b) may also be a mixture of two or more compounds of formula I. Apart from the stabiliser of formula I, the polymer composition may also comprise other known stabilisers, for example antioxidants, light-stabilisers, metal deactivators or processing stabilisers. The following compounds are examples thereof.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dimethylphenol, 2,6-di-octadecyl-4-methylphenol, 2,4,6-tri-cyclohexylphenol, 2,6-di-tert-butyl-4-methoxymethylphenol, 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol and mixtures thereof.

1.2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecylthiomethyl-4-nonylphenol.

1.3. Hydroquinones and alkylated hydroquinones, for example 2,6-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Hydroxylated thiodiphenyl ethers, for example 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis-(2,6-dimethyl-4-hydroxyphenyl)disulfide.

1.5. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis-(6-tert-butyl-4-isobutylphenol), 2,2'-methylene-bis[6-(α-methylbenzyl)-4-nonylphenol], 2,2'-methylene-bis[6-(α,α-di-methylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris-(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methyl-benzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.6. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl mercaptoacetate.

1.7. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)-malonate, di-dodecylmercaptoethyl-2,2-bis(3,5-di-tert-butyl-4-hydroxybenzyl)malonate, di-[4-(1,1,3,3-tetramethylbutyl)-phenyl]-2,2-bis(3,5-di-tert-butyl-4-hydroxybenzyl)malonate, 1.8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.10. Benzyl phosphonates, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoethyl ester.

1.11. Acylaminophenols, for example 4-hydroxylauric acid anilide, 4-hydroxystearic acid anilide, N-(3,5-di-tert-butyl-4-hydroxyphenyl)-carbamic acid octyl ester.

1.12. Esters of β-(3,5-di-tert-butyl-4-hydroxyphenyl)-propionic acid with mono- or polyhydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N', bis-(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]-octane.

1.13. Esters of β-(5-tert-butyl-4-hydroxy-3-methylphenyl)-propionic acid with mono- or poly-hydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxethyl)oxalic acid diamide, 3-thiaundecanol, 3-thiapentadecanol, trimethylhexanediol, trimethylolopropane, 4-hydroxymethyl-1-phospha-2,6,7-trioxabicyclo[2.2.2]octane.

1.14. Esters of β-(3,5-dicyclohexyl-4-hydroxyphenyl)-propionic acid with mono- or polyhydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert-butyl-4-hydroxyphenylacetic acid with mono- or poly-hydric alcohols, for example methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert-butyl-4-hydroxyphenyl)-propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)hydrazine.

2. UV absorbers and light-stabilisers 2.1. 2-(2'-hydroxyphenyl)-benzotriazoles, for example 5'-methyl-, 3',5'-di-tert-butyl-, 5'-tert-butyl-, 5'-(1,1,3,3-tetramethylbutyl)-, 5-chloro-3',5'-di-tert-butyl-, 5-chloro-3'-tert-butyl-5'-methyl-, 3'-sec-butyl-5'-tert-butyl-, 4'-octoxy-, 3',5'-di-tert-amyl-, 3',5'-bis(α,α-dimethylbenzyl)-, mixture of 5-chloro-3'-tert-butyl-5'-(2-octyloxycarbonylethyl)- and 5-chloro-3'-tert-butyl-5'-[2-(2-ethylhexyloxy)-carbonylethyl]-, 5-chloro-3'-tert-butyl-5'-(2-methoxycarbonylethyl)-, 3'-tert-butyl-5'-(2-methoxycarbonylethyl)-, 3'-tert-butyl-5'-(2-octyloxycarbonylethyl)-, 3'-tert-butyl-5'-[2-(2-ethylhexyloxy)-carbonylethyl]-, 3'-dodecyl-5'-methyl-and 3'-tert-butyl-5'-(2-isooctyloxycarbonylethyl)-2'-hydroxyphenyl-2H-benzotriazole(2), 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxy-phenyl]-2H-benzotriazole with polyethylene glycol 300; [R—CH$_2$CH$_2$—COO(CH$_2$)$_3$]$_2$, wherein R=3'-tert-butyl-4'-hydroxy-5'-2H-benzotriazol-2-yl-phenyl.

2.2. 2-hydroxybenzophenones, for example the 4-hydroxy, 4-methoxy, 4-octoxy, 4-decyloxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline.

2.5. Nickel compounds, for example nickel complexes of 2,2'-thio-bis[4-(1,1,3,3-tetramethylbutyl)phenol], such as the 1:1 or the 1:2 complex, where appropriate with additional ligands, such as n-butylamine, triethanolamine or N-cyclohexyl-diethanolamine, nickel dibutyl dithiocarbamate, nickel salts of 4-hydroxy-3,5-di-tert-butyl benzyl phosphonic acid monoalkyl esters, such as the methyl ester or the ethyl ester, nickel complexes of ketoximes, such as 2-hydroxy-4-methyl-phenyl-undecyl ketoxime, nickel complexes of 1-phenyl-4-lauroyl-5-hydroxy-pyrazole, where appropriate with additional ligands.

2.6. Sterically hindered amines, for example bis(2,2,6,6-tetramethyl-piperidyl)sebacate, bis(2,2,6,6-tetramethyl-piperidyl)succinate, bis(1,2,2,6,6-pentamethylpiperidyl)sebacate, n-butyl-3,5-di-tert-butyl-4-hydroxybenzyl-malonic acid bis(1,2,2,6,6-pentamethylpiperidyl) ester, condensation product of 1-hydroxyethyl-2,2,6,6-tetramethyl-4-hydroxypiperidine and succinic acid, condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butyl benzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, condensation product of N,N'-bis(2,2,6,6-tetramethyl-4-piperidyl)hexamethylenediamine and 4-morpholino-2,6-dichloro-1,3,5-triazine, condensation product of 2-chloro-4,6-di-(4-n-butylamino-2,2,6,6-tetramethylpiperidyl)-1,3,5-triazine and 1,2-bis(3-aminopropylamino)ethane, condensation product of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione.

2.7. Oxalic acid diamides, for example 4,4'-di-octyloxy-oxanilide, 2,2'-di-octyloxy-5,5'-tert-butyl oxanilide, 2,2'-di-dodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'- di-tert-butyl oxanilide, mixtures of o- and p-methoxy-disubstituted and of o- and p-ethoxy-disubstituted oxanilides.

2.8. Further 2-(2-hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propoxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-8 2-hydroxy-4-(2-hydroxy-3-butoxy-propoxy)phenyl]-4,6-bis(2,4-dimethylphenyl)-1,3,5-triazine, 2-[2-hydroxy-4-(2-hydroxy-3-octyloxy-propoxy)-phenyl]-4,6-bis-(2,4-dimethylphenyl)-1,3,5-triazine.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide, oxanilide, isophthalic acid dihydrazide, sebacic acid bisphenylhydrazide, N,N'-diacetaladipic acid dihydrazide, N,N'-bis-salicyloyl-oxalic acid dihydrazide, N,N'-bis-salicyloyl-thiopropionic acid dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bisisodecyloxypentaerythritol diphosphite, bis(2,4-di-tert-butyl-6-methylphenyl)pentaerythritol diphosphite, bis(2,4,6-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, 6-fluoro-2,4,8,10-tetra-tert-butyl-12-methyl-dibenz[d,g]-1,3,2-dioxaphosphocine.

5. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyl dithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylprrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or stannic pyrocatecholate.

8. Nucleation agents, for example 4-tert-butylbenzoic acid, adipic acid, diphenylacetic acid.

9. Fillers and thickeners, for example calcium carbonate, silicates, glass fibres, asbestos, talcum, kaolin, mica, barium sulfate, metal oxides and hydroxides, carbon black, graphite.

10. Other additives, for example plasticisers, lubricants, emulsifiers, pigments, optical brighteners, flame-retardants, antistatic agents, blowing agents.

The addition of the stabiliser and, where appropriate, further additives to the polymer is advantageously effected before the shaping, for example by mixing the pulverulent components or by adding the stabiliser to the melt or solution of the polymer.

The invention therefore relates also to a method for stabilising thermoplastic polymers that comprise hetero atoms in the main chain against damage by light, oxygen and heat, which method comprises adding to the polymers as stabiliser at least one compound of formula I, and to the use of compounds of formula I for stabilising thermoplastic polymers that comprise hetero atoms in the main chain against damage by light, oxygen and heat.

The resulting stabilised polymer compositions can be converted in accordance with customary methods, for example hot compression moulding, spinning, extruding or injection moulding, into shaped articles, for example fibres, films, small strips, sheets, profiled sheets, vessels, pipes and other profiles.

The invention therefore relates also to the use of the polymer composition according to the invention for the preparation of a shaped article.

Also of interest is the use of the polymer composition according to the invention is multilayer systems. In that case a polymer composition according to the invention having a relatively high content of stabiliser of formula I, for example 5–15% by weight, is applied in a thin layer (10–100 μm) to a shaped article made from a polymer that comprises little or no stabiliser of formula I. The layer can be applied simultaneously with the shaping of the basic article, for example by means of so-called co-extrusion. The layer can, however, also be applied to the ready-shaped basic article, for example by means of lamination with a film or coating with a solution. The outer layer or layers of the finished article act as a UV filter which protects the interior of the article against UV light. The outer layer preferably comprises 5–15% by weight, especially 5–10% by weight, of at least one stabiliser of formula I.

The invention therefore relates further to the use of the polymer composition according to the invention for the preparation of multi-layer systems, wherein the outer layer(s) is(are) a polymer composition according to the invention in a thickness of 10–100 μm, while the inner layer consists of a polymer that may comprise little or no stabiliser of formula I.

Of especial interest is the use of a polymer composition according to the invention wherein component (a) is a polycarbonate for the preparation of multi-layer systems.

The polymers stabilised in that manner are distinguished by good fastness to weathering, and especially by a high degree of resistance to UV light. For that reason they retain their mechanical properties and their colour and lustre over a long period of time, even when used outside.

The Examples that follow serve to illustrate the invention in detail, without limiting it thereto. In the Examples parts and percentages are by weight; room temperature denotes a temperature from 20° to 25° C. The following UV absorbers are used:

Ph-1: 2,4-diphenyl-6-(2-hydroxy-4-propoxyphenyl)-1,3,5-triazine;

Ph-2: 2,4-diphenyl-6-(2-hydroxy-4-benzyloxyphenyl)-1,3,5-triazine;

Ph-3: 2,4-diphenyl-6-(2-hydroxy-4-butoxyphenyl)-1,3,5-triazine;

Ph-4: 2,4-diphenyl-6-(2-hydroxy-4-hexyloxyphenyl)-1,3,5-triazine;

Ph-5: 2,4-diphenyl-6-(2-hydroxy-4-methoxyphenyl)-1,3,5-triazine;

To-1: 2,4-di-p-tolyl-6-(2-hydroxy-4-propoxyphenyl)-1,3,5-triazine;

To-2: 2,4-di-p-tolyl-6-(2-hydroxy-4-benzyloxyphenyl)-1,3,5-triazine;

To-3: 2,4-di-p-tolyl-6-(2-hydroxy-4-butoxyphenyl)-1,3,5-triazine;

To-4: 2,4-di-p-tolyl-6-(2-hydroxy-4-hexyloxyphenyl)-1,3,5-triazine;

To-5: 2,4-di-p-tolyl-6-(2-hydroxy-4-methoxyphenyl)-1,3,5-triazine;

Xy-1: 2,4-di(2,4-dimethylphenyl)-6-(2-hydroxy-4-propoxyphenyl)-1,3,5-triazine (comparison);

Xy-2: 2,4-di(2,4-dimethylphenyl)-6-(2-hydroxy-4-benzyloxyphenyl)-1,3,5-triazine (comparison);

Xy-3: 2,4-di(2,4-dimethylphenyl)-6-(2-hydroxy-4-butoxyphenyl)-1,3,5-triazine (comparison);

Xy-4: 2,4-di(2,4-dimethylphenyl)-6-(2-hydroxy-4-hexyloxyphenyl)-1,3,5-triazine (comparison);

Xy-5: 2,4-di(2,4-dimethylphenyl)-6-(2-hydroxy-4-methoxyphenyl)-1,3,5-triazine (comparison).

EXAMPLE 1

With stirring at room temperature, 10 g of polycarbonate powder (Lexan ® 115) are dissolved in 50 g of methylene chloride, which takes several hours. 0.1 g, 0.2 g or 0.5 g of UV absorber, corresponding to additive concentrations of 1,2 and 5%, are added thereto. Films 20 μm thick are cast from those solutions.

The films are exposed in an Atlas Weatherometer CI 65 at a black panel temperature of 63° C. and a relative humidity of 60%. At regular intervals the discolouration of the samples is tested by measuring the Yellowness Index (YI, ASTM D 1925 method). The exposure time required to reach a Yellowness Index of 7 is shown in Table 1.

The films are then exposed further until they become brittle; this is indicated by the formation of cracks in the films. The exposure time required for the films to become brittle is also shown in Table 1.

TABLE 1

Exposure time (h) required to reach a Yellowness Index (YI) = 7 and for the films to become brittle

| UV absorber | Exposure time (h) until | |
|---|---|---|
| | YI = 7 | films are brittle |
| none | 990 | 1100 |
| 1% Xy-1 | 1700 | 3900 |
| 1% Ph-1 | 2200 | 4100 |
| 1% To-1 | 2100 | 4020 |
| 2% Xy-1 | 1800 | 4500 |
| 2% Ph-1 | 2300 | 7740 |
| 2% To-1 | 2100 | 6680 |
| 5% Xy-1 | 1900 | 6000 |
| 5% Ph-1 | 5700 | 10990 |
| 5% To-1 | 4000 | 10990 |

EXAMPLE 2

Films prepared in accordance with the instructions given in Example 1 are aged in a circulating-air furnace at 140° C. As in Example 1 the ageing time required to reach a Yellowness Index of 7 and the time required for the films to become brittle are measured.

Table 2 shows the results obtained.

TABLE 2

Ageing time (h) required to reach a Yellowness Index (YI) = 7 and for the films to become brittle

| UV absorber | Time in hours at 140° C. until | |
|---|---|---|
| | YI = 7 | films are brittle |
| 1% Xy-1 | 500 | 2100 |
| 1% Ph-1 | 3250 | 3250 |
| 1% To-1 | 2440 | 2900 |
| 2% Xy-1 | 300 | 1500 |
| 2% Ph-1 | 3350 | 3350 |
| 2% To-1 | 1300 | 2350 |
| 5% Xy-1 | 120 | 700 |
| 5% Ph-1 | 2940 | 3000 |
| 5% To-1 | 1150 | 1700 |

EXAMPLE 3

Polycarbonate powder is mixed with 0.3% of different UV absorbers and processed in a double screw extruder at a mass temperature of 275° C. and at 25 rpm to form granules.

The granules are processed on an injection-moulding machine (240°/300° C./75 bar) to form sheets measuring 67×43×2 mm. The sheets are exposed in an Atlas Weatherometer CI 65 as in Example 1. Table 3 indicates the exposure time required to reach a Yellowness Index of 25 (YI measured in accordance with ASTM D-1925).

TABLE 3

Exposure time (h) required to reach a Yellowness Index (YI) = 25

| UV absorber | Exposure time (h) until YI = 25 |
|---|---|
| none | 900 |
| 0.3% Xy-1 | 2700 |
| 0.3% Ph-1 | 3500 |
| 0.3% To-1 | 3100 |

EXAMPLE 4

Polycarbonate films comprising 2% by weight of UV absorber are prepared and exposed in accordance with the method given in Example 1. Table 4 indicates the exposure time after which a Yellowness Index of 7 has been reached.

The films are then exposed further until they become brittle. The exposure time required for this is likewise given in Table 4.

TABLE 4

Exposure time (h) required to reach a Yellowness Index (YI) = 7 and for the films to become brittle

| UV absorber | Exposure time (h) until | |
|---|---|---|
| | YI = 7 | films become brittle |
| none | 990 | 1100 |
| 2% Ph-2 | 2480 | 8040 |
| 2% Ph-3 | 2560 | 5900 |
| 2% Ph-4 | 2560 | 5550 |
| 2% Ph-5 | 2690 | 7540 |
| 2% To-2 | 2270 | 5900 |
| 2% To-3 | 2400 | 5550 |
| 2% To-4 | 2375 | 5060 |
| 2% Xy-2 | 1850 | 3900 |
| 2% Xy-3 | 1860 | 3900 |
| 2% Xy-4 | 1950 | 3900 |

EXAMPLE 5

Films prepared in accordance with the instructions given in Example 4 are aged in a circulating-air furnace at 130° C. As in the Example referred to, the ageing time required to reach a Yellowness Index of 7 and the time required for the films to become brittle are measured.

Table 5 shows the results obtained.

TABLE 5

Ageing time (h) required to reach a Yellowness Index (YI) = 7 and for the films to become brittle

| UV absorber | Time in hours at 130° C. until | |
|---|---|---|
| | YI = 7 | films become brittle |
| 2% Ph-2 | 1840 | 7000 |
| 2% Ph-3 | 5030 | 7000 |
| 2% Ph-4 | 4170 | 7000 |
| 2% Ph-5 | 5580 | 8000 |
| 2% To-2 | 2460 | 4720 |
| 2% To-3 | 2790 | 4720 |
| 2% To-4 | 2750 | 4720 |
| 2% Xy-2 | 750 | 3030 |
| 2% Xy-3 | 790 | 2530 |
| 2% Xy-4 | 820 | 3030 |

EXAMPLE 6

Polycarbonate films comprising 2% by weight of UV absorber are prepared and exposed as described in Example 1. At regular intervals the tensile strength of the films is measured at room temperature (cross-speed 20 mm/min, dumb-bell according to DIN 53448/1, width of sample 10 mm, thickness of sample 20 µm). Table 6 shows the exposure time after which only 50% of the original tensile strength has been reached.

TABLE 6

| UV absorber | Exposure time (h) until 50% tensile strength |
|---|---|
| none | 690 |
| 2% Xy-1 | 1420 |
| 2% Ph-1 | 1670 |
| 2% To-1 | 1860 |

EXAMPLE 7

3 kg of polybutylene terephthalate powder (Crastin ® S 600) are mixed dry for 2 minutes in a Henschel mixer with each of 0.1% by weight of pentaerythritol tetrakis(3-[3',5'-di-tert-butyl-4'-hydroxyphenyl]-propionate), 0.4% by weight tris(2,4-di-tert-butylphenyl)-phosphite and 0.5% by weight of the UV absorber shown in Table 7 and then processed to form granules in a Berstorff double screw extruder at a speed of 100/min and at a temperature setting of 230° C./240° C./250° C./250° C. Using an injection-moulding apparatus (type Arburg L, material temperature 260° C., tool temperature 70° C.), sheets measuring 67 mm×43 mm and having a thickness of 1 mm are made from each mixture.

After being stored for 30 days at room temperature, the sheets are exposed in an Atlas Weatherometer CI 65 at a black panel temperature of 63° C. and a relative humidity of 60%, a rain cycle of 102 min dry/18 min wet being set. At regular intervals the discolouration of the samples is tested by measuring the Yellowness Index (YI, ASTM D 1925 method). Table 7 shows the exposure time in which an increase in the Yellowness Index of ΔYI=10 takes place.

TABLE 7

| UV absorber | Exposure time (h) until 6YI = 10 |
|---|---|
| 0.5% Xy-1 | 1520 |
| 0.5% To-1 | 2850 |
| 0.5% Ph-1 | 3130 |

EXAMPLE 8

Polyamide-6 powder (Ultramid ® B3S, manufactured by BASF) is mixed dry for 2 minutes in a Henschel mixer with the stabilisers shown in Table 8 and then processed in a Berstorff double screw extruder at a speed of 95/min and a temperature setting of 230° C./235° C./240° C./240° C. The amounts of stabiliser are given in % by weight, based on the amount of polyamide used. Sheets 2 mm thick are prepared from each mixture using an injection-moulding apparatus (type Arburg L, material temperature 240° C., tool temperature 80° C.).

The sheets are exposed in an Atlas Weatherometer CI 65 at a black panel temperature of 63° C. and a relative humidity of 60%, a rain cycle of 102 min dry/18 min wet being set. The time required for the cracks on the sheets to become visible is measured. The results of the measurements are shown in Table 8.

In addition to the stabilisers according to the invention mentioned above, the following additional stabilisers are used:

A N,N'-bis(3-[3',5'-di-tert-butyl-4'-hydroxyphenyl]-propionyl)hexamethylenediamine B tris(2,4-di-tert-butyl phenyl)phosphite, C condensation product of N,N'-bis(2,2,6,6-tetramethyl-4-piperidyl)hexamethylenediamine and 4-tert-octylamino-2,6-dichloro-1,3,5-s-triazine having a melting point of 120°-150° C.

TABLE 8

| Stabilisers | Time (h) required for cracks to appear time (h) |
|---|---|
| none | 1050 |
| 0.2% A + 0.2% B | 2620 |
| 0.2% A + 0.2% B + 0.3% Xy-1 | 2950 |
| 0.2% A + 0.2% B + 0.3% To-1 | 3320 |
| 0.2% A + 0.2% B + 0.3% Ph-1 | 3930 |
| 0.2% A + 0.2% B + 0.3% Xy-1 + 0.3% C | 5900 |
| 0.2% A + 0.2% B + 0.3% To-1 + 0.3% C | 6200 |
| 0.2% A + 0.2% B + 0.3% Ph-1 + 0.3% C | >6200 |

EXAMPLE 9

Polyoxymethylene (Hostaform ® C) is kneaded for 7 minutes at 190° C. and 30 rpm in a Brabender Plasticorder with each of 0.3% by weight of calcium stearate, 0.3% by weight of a stabiliser of the formula

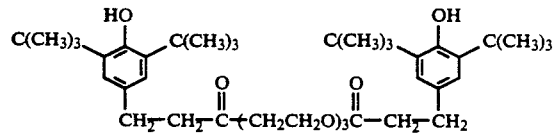

and 0.3% by weight of the UV absorber given in Table 9. The material is then compressed at 190° C. under a pressure of 3000 psi to form sheets 1 mm thick; the processing time in this step is 3 minutes.

The sheets are exposed at 60° C. and a humidity of 23% to a UV-A source at a distance of 20 cm. The UV-A source comprises 5 TL/09 fluorescent lamps and 5 TL/12 lamps (wave-length range 295–400 nm). At regular intervals the Yellowness Index (YI, ASTM D 1925 method), which passes through a maximum in the case of UV exposure of polyoxymethylene, is measured. That maximum is caused by a first occurrence of microcracks that are not yet visible. On further exposure, at a later point in time cracks in the sheets can be seen. Table 9 shows the exposure times in weeks required to reach the maximum of the Yellowness Index and for visible cracks to appear.

TABLE 9

Exposure time in weeks to YI maximum and to the appearance of visible cracks in the test sheets

| UV absorber | Exposure time (weeks) to | |
|---|---|---|
| | YI maximum | crack formation |
| 0.3% Xy-5 | 8 | 16 |
| 0.3% To-5 | 10 | 20 |
| 0.3% Ph-5 | 16 | 25 |

The test results shown in Examples 1–9 show markedly improved properties when using the stabilisers according to the invention (diphenyl- and di-p-tolyl derivatives of 1,3,5-triazine) as compared with the known dixylyl derivatives.

What is claimed is:

1. A polymer composition stabilised against damage by light, oxygen and heat, comprising
   a) a thermoplastic polymer that comprises hetero atoms in the main chain, and
   b) an effective stabilising amount of a hydroxyphenyltriazine compound of formula I

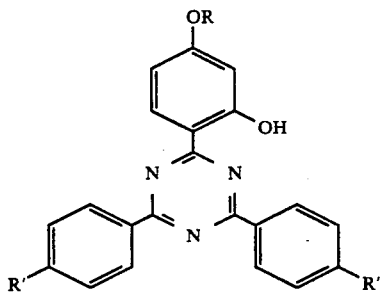

wherein R is $C_1$–$C_{18}$alkyl, $C_2$–$C_6$alkyl substituted by halogen or by $C_1$–$C_{12}$alkoxy, or is benzyl and R' is hydrogen or methyl.

2. A polymer composition according to claim 1, wherein component a) is a polycarbonate, polyester, polyamide, polyacetal, polyphenylene oxide or polyphenylene sulfide.

3. A polymer composition according to claim 1, wherein component a) is a polycarbonate.

4. A polymer composition according to claim 1, wherein component b) is a compound of formula I wherein R is $C_1$–$C_{12}$alkyl or benzyl.

5. A polymer composition according to claim 1, wherein component b) is a compound of formula I wherein R is $C_3$–$C_6$alkyl.

6. A polymer composition according to claim 1, wherein component b) is a compound of formula I wherein R' is hydrogen.

7. A polymer composition according to claim 1, comprising from 0.1 to 15 parts by weight of the stabiliser of component b) per 100 parts by weight of the polymer of component a).

8. A polymer composition according to claim 1, comprising in addition to components a) and b) another stabiliser or other additive.

9. A method for stabilising a thermoplastic polymer containing hetero atoms in the main chain against damage by light, oxygen and heat, which comprises adding to said polymer an effective stabilising amount of a compound of formula I

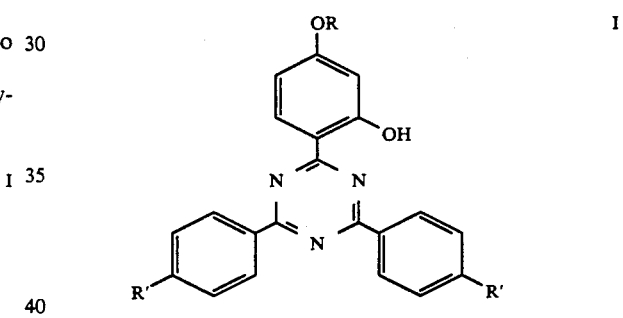

wherein R is $C_1$–$C_{18}$alkyl, $C_2$–$C_6$alkyl substituted by halogen or by $C_1$–$C_{12}$alkoxy, or is benzyl and R' is hydrogen or methyl.

10. A shaped article comprising a polymer composition according to claim 1.

11. A multi-layer system wherein an outer layer is a polymer composition according to claim 1 in a thickness of 10–100 μm.

* * * * *